United States Patent [19]
Jaffe et al.

[11] 3,733,506

[45] May 15, 1973

[54] COMMUTATED WOUND ARMATURE ASSEMBLIES

[75] Inventors: Wolfgang Jaffe, Roselle Park; John W. Wurst, Dover, both of N.J.

[73] Assignee: The Singer Company, New York, N.Y.

[22] Filed: Oct. 29, 1971

[21] Appl. No.: 193,934

[52] U.S. Cl. ................310/198, 310/220, 310/223
[51] Int. Cl. ..........................................H02k 3/16
[58] Field of Search...............310/189, 198–207, 310/220–225

[56] References Cited

UNITED STATES PATENTS

| | | | |
|---|---|---|---|
| 1,869,187 | 7/1932 | Dreghorn | 310/223 X |
| 2,180,327 | 11/1939 | Wilber | 310/203 |
| 2,529,526 | 11/1950 | Weathers | 310/225 |
| 2,668,926 | 2/1954 | Johnson | 310/225 X |

FOREIGN PATENTS OR APPLICATIONS 297,958  4/1954  Switzerland..................310/225

Primary Examiner—D. F. Duggan
Attorney—Marshall J. Breen et al.

[57] ABSTRACT

Winding configurations for the armature of small commutator type motors are disclosed in which a first winding can be identified as just completing commutation at one brush at the same time that a second winding is in the midst of being short circuited by the other brush. The windings are distributed and arranged to be closely coupled to each other by having coil sides of each winding in slots common to both. In this manner, the abrupt current change required by the commutation process can be compensated for by an opposite change in current in the coupled short-circuited winding and with a minimum instantaneous flux change. This results in significantly reduced sparking, longer brush and commutator life and reduced electromagnetic interference (EMI).

4 Claims, 8 Drawing Figures

COMMUTATED WOUND ARMATURE ASSEMBLIES

FIELD OF THE INVENTION

This invention is related to winding arrangements for the armature coils of small commutator motors preferably of the type having two diametrically spaced brushes and suitable for driving sewing machines, portable tools and the like. These winding arrangements result in significantly improved commutation with respect to that obtained by prior art armature windings.

DESCRIPTION OF THE PRIOR ART

Substantially all of the prior art motors of the type to which the present invention relates have employed simple lap-wound armatures of the single coil type. While the commutation of these prior motors has been notably poor, little effort has been made to improve the commutation at its source by special armature winding configurations. Rather, the practical approach has been through the use of special brush material to increase useful brush life to a tolerable level but leaving the commutation relatively unaffected. Where electromagnetic interference has been a problem, resort has generally been made to the use of conventional line filters and shielding which merely isolated the interference without doing anything about its basic source, viz., poor commutation. It has been suggested by the prior art that a physically more-compact armature winding results if a distributed commutated winding is used to reduce the end-turn build up. This is shown in the Hunsdorf U.S. Pat. No. 2,779,886. However, in this prior invention the improvement resides only in lower armature copper losses and no claim is or can be made for improved commutation which is the essential attribute of the present invention.

SUMMARY OF THE INVENTION

In accordance with the teachings of the present invention, the armature windings between adjacent commutator bars are not lumped but are distributed over several slots so that the winding just completing commutation at one brush may be closely coupled to another winding which is, at that moment, in the midst of being short-circuited through the other brush. This is accomplished by arranging the individual armature coils so that the commutated winding shares as many slots as possible in common with the short-circuited winding. In this manner the abrupt change in the current in the coils undergoing commutation is compensated by an opposite change in current produced in the coils which are short-circuited and with minimum instantaneous flux change thus resulting in minimum sparking between brushes and commutator. If this coupling were perfect there would be no sparking voltage and perfect commutation would result. In practice and according to this invention it is possible to obtain sufficiently close coupling to significantly improve the commutation and without requiring winding configurations which are too complicated to wind practically.

A word of explanation which applies to all the figures is in order. In each figure the top series of rectangles represent the armature teeth so that the spaces between rectangles represent the armature slots. This is a flat development of the armature and the first tooth at the left is repeated as the last tooth at the right. The series of connected rectangles below the armature teeth in each figure represent the commutator ring of bars with each vertical line representing the insulation between bars.

Figure 2:
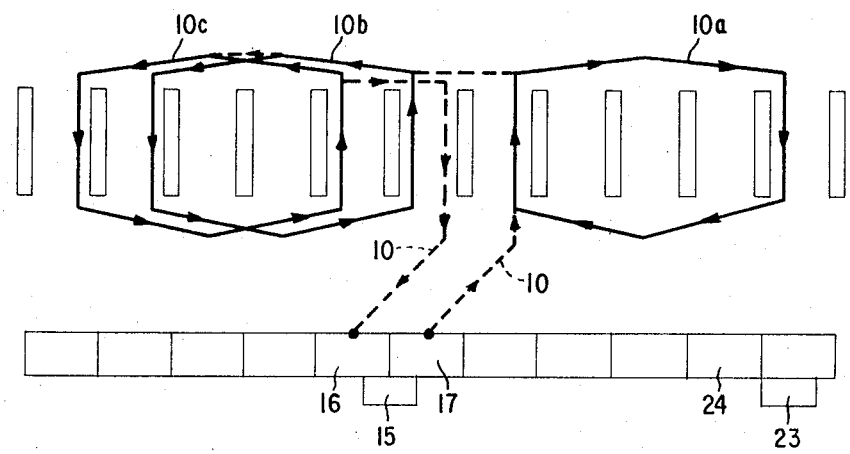
FIG. 2 is a schematic diagram showing the winding configuration between adjacent commutator bars for an 11 bar, 11 slot armature embodying this invention.

Each figure, except FIG. 2, represents a specific moment in time at which one winding is just completing its commutation at one brush. It will be understood that a moment later commutation will be completed at the other brush with respect to the winding which was short-circuited before and this process continues as the armature rotates with respect to the brushes. One brush is just completing the commutation of one winding at which time the other brush is short-circuiting a second winding and this occurs successively on an alternating basis with respect to the two brushes. The current in each winding must be reversed in the time required for the insulated segment to pass under one brush. Only two (or three) windings are shown in the drawings for simplicity because these windings are the only ones affecting the commutation at the moment and to show other windings would only needlessly complicate the picture. It will be understood that a complete armature has additional windings identical to those shown so that all slots are symmetrically filled with coil sides and form two parallel paths for current flow between the brushes in accordance with ordinary armature winding techniques. The point is that the winding relationship shown and defining this invention exists successively for every winding as it completes its commutation and so is effective for the commutation as a whole. Thus by establishing the coupling relationship between two specific windings at the moment of completing the commutations of one winding this invention is defined with respect to a fully wound armature.

Figure 1:
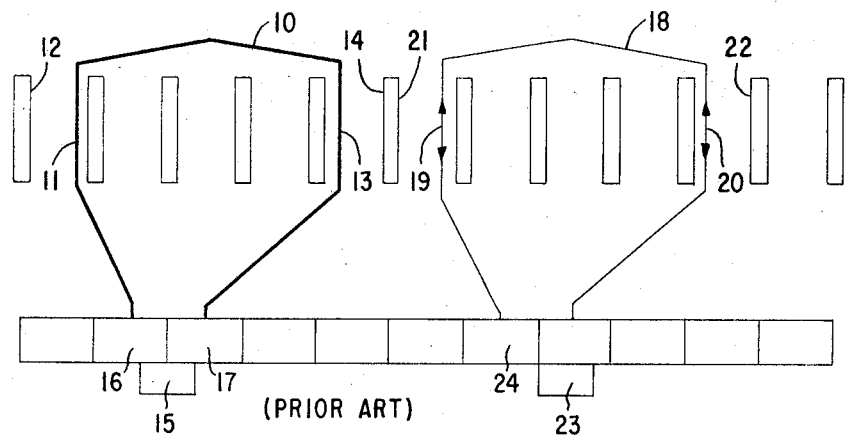
FIG. 1 is a schematic diagram of a conventional prior art single-coil lap winding applied to a two-pole armature having 11 bars and 11 slots with a coil pitch of 1–5.

Referring now to FIG. 1 which shows a lap winding of conventional prior art type having single coils between adjacent commutator bars, it will be seen that winding 10 having a coil side 11 lying in slot 12 and coil side 13 lying in slot 14 is in the midst of being short-circuited through brush 15 which spans commutator segments 16 and 17. At the same time winding 18 having coil sides 19 and 20 lying in slots 21 and 22 respectively, is just completing its commutation because brush 23 is just moving out of contact with segment 24. The coil sides of the winding just completing commutation will be conveniently distinguished in all the drawings by the double arrows applied to the coil sides. It will be observed that no coil side of winding 10 lies in the same slot with a coil side of winding 18 as required by the teachings of this invention. Thus there is very little mutual couping between these windings and the abrupt change of current in winding 18 required by the commutation process cannot be balanced by a mutual change of current in winding 10. This results in the generation of a sparking voltage in winding 18 which produces destructive arcing as brush 23 leaves contact with segment 24. This also produces electrical noise interference which may have adverse effects on nearby radio and television receivers as is well known.

FIG. 2 is illustrative of a winding configuration for an 11 bar, 11 slot armature made in accordance with the present invention and presents a single typical winding between adjacent commutator bars which has, for this embodiment, six coil sides in six different slots. It will be noted that this arrangement of distributed coils provides a maximum number of slots for common coupling with another similar winding, which is the underlying principle of this invention. In comparison with the conventional lap winding of FIG. 1, the single-coil winding 10 has now been distributed in three coils 10a, 10b and 10c, each having a pitch of 1-5. Coil 10a is wound in a forward direction and coils 10b and 10c are wound in a backward direction. It will be seen that the winding of FIG. 2 covers essentially the entire periphery of the armature with the relatively reversed coils being necessary to make the torque produced by each coil side additive.

Figure 3:
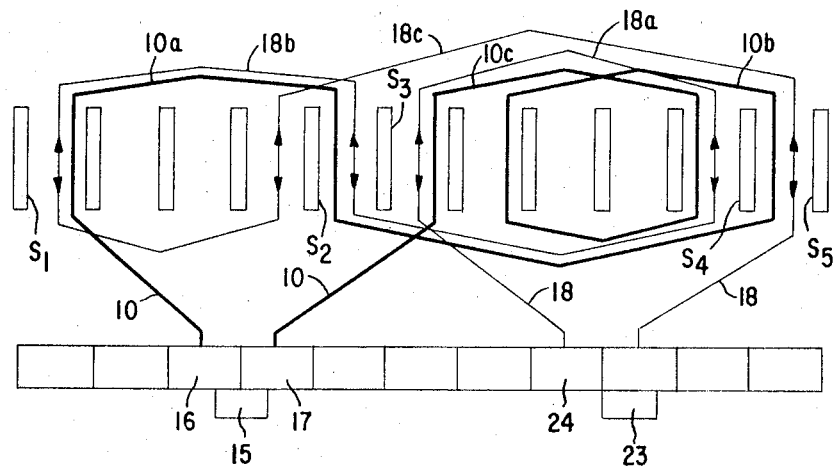
FIG. 3 is a schematic diagram showing the coupled relation between windings made in accordance with the embodiment of FIG. 2.

FIG. 3 is a schematic diagram showing the coupling between two windings, each of the same configuration as the single winding shown in FIG. 2. Windings 10 and 18 are now each distributed in six slots instead of two as in FIG. 1. It will be noted that there are five slots $S_1$, $S_2$, $S_3$, $S_4$, $S_5$ which contain coil sides common to both windings. This provides substantial mutual coupling between the windings 10 and 18 and permits current change in winding 18 with less flux change than with the arrangement of FIG. 1. Thus the sparking voltage generated in winding 18 of FIG. 3 is reduced and the commutation is accordingly improved. Further, the winding 18 of FIG. 3, being distributed, has less self-inductance than the winding 18 of FIG. 1 which is lumped in one coil per bar. Since self-inductance is a measure of the kinetic energy storage capability, the winding 18 of FIG. 3 cannot store and therefore cannot later release as much energy as winding 18 of FIG. 1. Thus the energy available for generating sparking voltage is less and the commutation is accordingly improved.

Figure 4:
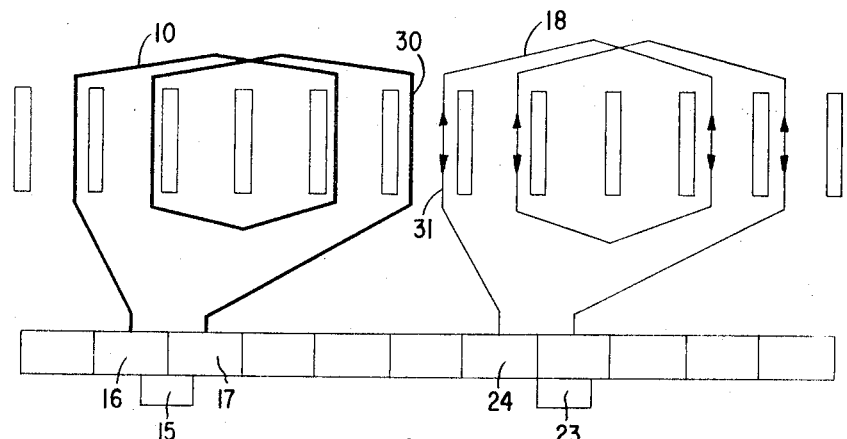
FIG. 4 is a schematic diagram showing a further embodiment of the present invention and derived as a simplification of the embodiment of FIG. 3.

FIG. 4 shows the application of the principle of this invention to the same armature core as shown in FIG. 1 and omitting the reverse coils in FIG. 2 and 3. Windings 10 and 18 are now each distributed in four slots instead of two as in FIG. 1. It will be noted that coil side 30 of winding 10 now occupies the same slot as coil side 31 of winding 18 which provides mutual coupling between the windings and permits current to change in winding 18 with less flux change than with the arrangement of FIG. 1. Thus the sparking voltage generated in winding 18 of FIG. 4, is reduced and the commutation is improved. It will be seen that the winding arrangement of FIG. 4 is a simplification derived from the arrangement of FIGS. 2 and 3 by omitting the single coils 10a and 18a. The windings in this case span approximately one-half the armature periphery and have the same winding direction. While the winding of FIG. 4 is easier to apply, it yields a smaller mutal coupling and is therefore less effective in improving commutation than the arrangement of FIG. 3.

It will be understood that the embodiments thus far shown use 11 slots only as an example of the principle involved and it is not intended that this invention be limited to any specific number of slots, odd or even. A larger number of slots of course provides more slots for closer coupling possibilities, but the winding becomes more complicated.

Figure 5:
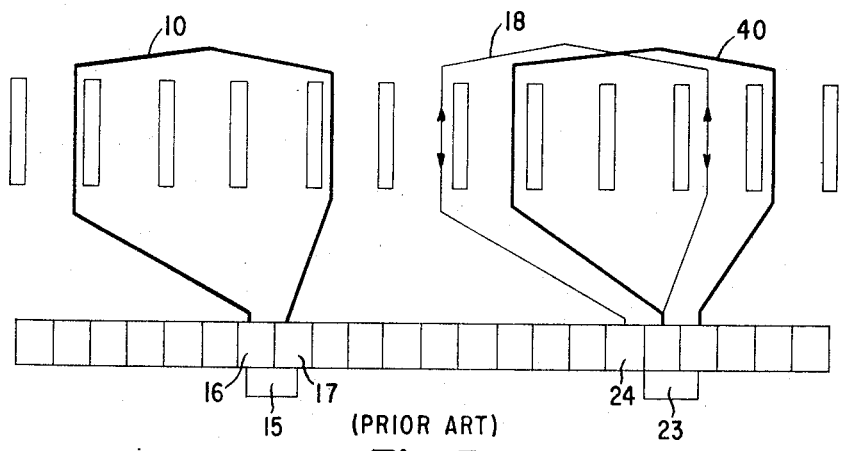
FIG. 5 is a schematic diagram of a conventional prior art single-coil lap-winding applied to a two-pole armature having 22 bars and 11 slots with a coil pitch of 1–5.

Further, it is possible to apply the principle of this invention to an armature having an even number of commutator bars. An example of this technique will be illustrated in FIG. 6 as applied to an armature having 11 slots and 22 bars with a winding pitch of 1-5. First, however, a conventional prior art lap winding for this armature is illustrated in FIG. 5. Referring to FIG. 5, the short-circuited winding 10 has no coupling slots in common with the winding 18 which is just completing commutation. A third winding 40 is also short-circuited but is not coupled to the winding 18 by any common slot relation and the coupling concept of this invention is not present.

Figure 6:
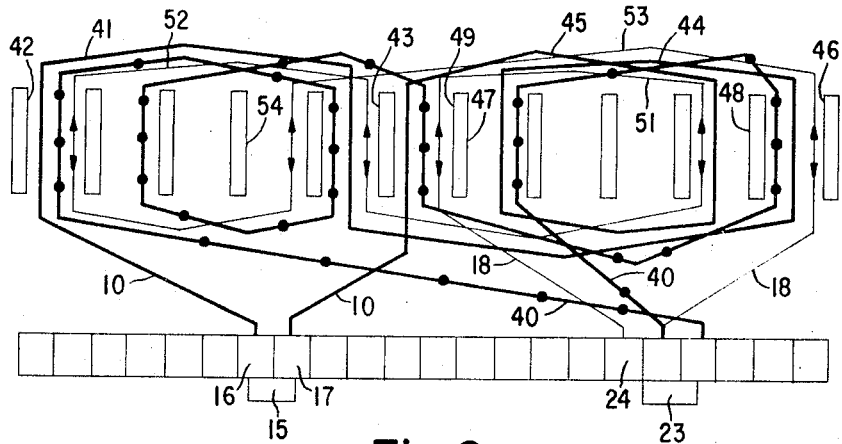
FIG. 6 is a schematic diagram of an armature winding for a two-pole, 22 bar, 11 slot armature illustrating an embodiment of this invention.

Referring now to FIG. 6, a winding arrangement embodying this invention is shown applied to the same core as shown in FIG. 5. This arrangement provides a very high degree of coupling between the winding 18 just completing commutation and another winding 10 under short-circuit condition. In this case each winding is distributed over substantially the entire armature periphery in six coil sides and of these, five coil sides lie in slots common to both windings.

If a brush wider than a commutator bar, as shown in FIG. 6 is used, an additional short-circuited winding 40 is coupled through four common slots with the winding 18 just completing commutation. It will be understood that the wide brush is not a limiting factor in this invention but its use does result in greater coupling between the winding just completing commutation and windings which, at that moment, are short-circuited thus improving the commutation over that obtainable with a narrower brush.

It will be seen in FIG. 6 that winding 10 consists of one coil 41 forwardly wound in slots 42, 43 and two coils 44, 45 each backwardly wound in slots 46, 47 and 48, 49 respectively. This winding 10 is short-circuited through brush 15.

Winding 18 consists of one coil 51 forwardly wound in slots 49, 48 one coil 52 backwardly wound in slots 43, 42 and one coil 53 backwardly wound in slots 54, 46. This winding 18 is just completing commutation through brush 23.

The winding 40, which is effective as a short-circuit coupled winding when a wide brush is used, is indicated in FIG. 6 by the superposed dots and it will be seen that this winding shares slots 42, 43, 46 and 49 in common with winding 18 and thus still further improves the coupling in accordance with the teaching of this invention. It will be seen that the windings of FIG. 6 which are connected between adjacent bars may be characterized as being distributed over substantially the entire armature periphery with the extreme coil sides spanning approximately 360 electrical degrees. That is to say, if each winding is considered as a distributed winding with series-connected forwardly and backwardly wound coils, the extreme outside coil sides of the winding as a whole span the entire number of slots in the armature. It will be further understood that, for a given multicoil winding, the number of turns in each coil need not be but preferably is the same.

Figure 7:
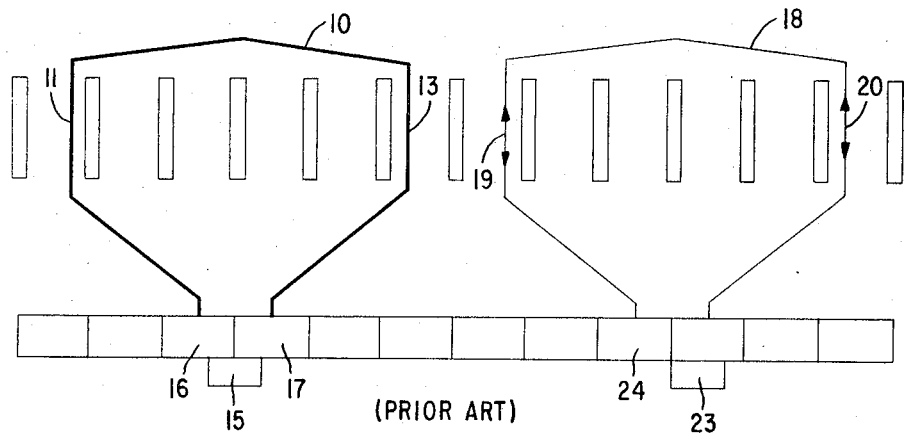
FIG. 7 is a schematic diagram of a conventional prior art single-coil lap-winding applied to a two-pole, 12 bar, 12 slot armature having a coil pitch of 1–6.
Figure 8:
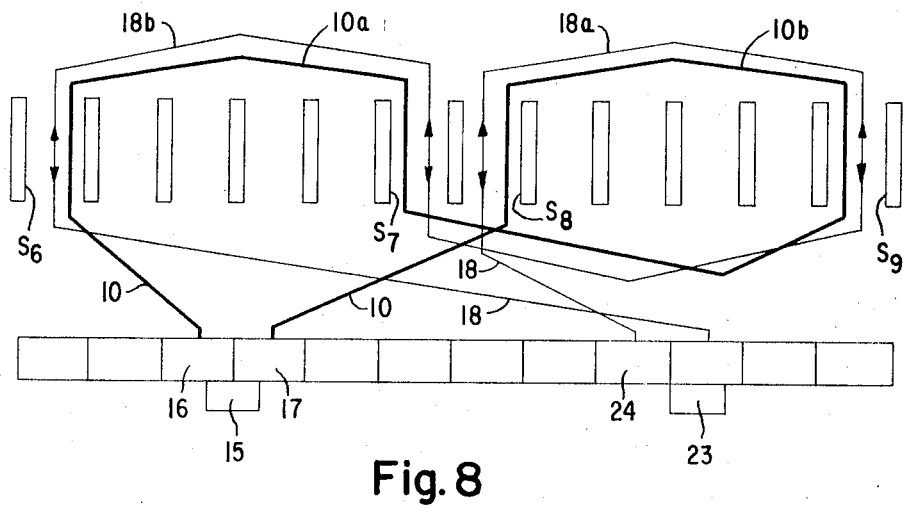
FIG. 8 is a schematic diagram of an armature winding for a two-pole 12 bar, 12 slot armature illustrating a further embodiment of this invention.

The principle of this invention may also be applied to armatures in which both slots and bars are an even number. This technique is shown in FIG. 8 as applied to an armature having 12 bars and 12 slots with a coil pitch of 1–6. First, however, a conventional single-coil lap-winding applied to this same armature core is shown in FIG. 7 and it will be seen that coil 10 which is short-circuited by brush 15 has no coil sides in slots common to the coil sides of winding 18 which is just completing its commutation at brush 23. There is no mutual coupling in FIG. 7 between windings 10 and 18 as defined by this invention and the commutation will be accordingly poor.

Referring now to FIG. 8 and in full accordance with the principle of the present invention, winding 10 is now distributed in two series-connected coils, 10a and 10b. Coil 10a is forwardly wound and coil 10b is backwardly wound. Similarly, winding 18 is now distributed in two series-connected coils, 18a and 18b. Coil 18a is forwardly wound and coil 18b is backwardly wound. It will be noted that every coil side of winding 10 lies in a slot common to a coil side of winding 18. These slots are indicated as $S_6$, $S_7$, $S_8$ and $S_9$ and this configuration represents the maximum possible degree of mutual coupling between windings 10 and 18, all in accordance with the basic principle of this invention. In FIG. 8 it will again be noted that the extreme coil sides of windings 10 and 18 span substantially the full armature periphery.

From the above it will be evident that the present invention defines winding arrangements for the armatures of small commutator type motors, which arrangements greatly improve the commutation of these motors. These arrangements are based on the principle of increased mutual coupling between a winding which is being short-circuited by one brush and a second winding which, at the same time, is just completing commutation by the other brush. This increased coupling is obtained by distributing the windings between adjacent commutator bars over several armature slots and then arranging the coil sides of each winding to lie in slots common to both windings. This may be done by a progressive winding as in FIG. 3. which is distributed over approximately one-half the armature periphery or by a winding as in FIG. 5 which consists of forwardly and backwardly wound coils distributed over the entire armature periphery.

Other modes of applying the principle of the invention may be employed, change being made as regards the details described provided the features stated in any of the following claims, or the equivalents of such, be employed.

Having thus described the nature of the invention, what I claim herein is:

1. A rotor assembly for an electric motor having brushes comprising: an armature mounted for rotation about its axis, said armature having a plurality of slots equally spaced about its periphery, a commutator ring mounted to turn with said armature with its axis coinciding with said armature axis and divided into a plurality of bars of equal arcuate length and insulated from each other for successive engagement with the brushes of the motor, a plurality of coils wound in said slots, said coils being connected to define a first distributed winding between a first pair of adjacent commutator bars and a second distributed winding between a second pair of adjacent commutator bars, certain of the coil sides of said first winding lying in the same slots as the coil sides of said second winding to form mutual coupling between said windings whereby when one winding is under commutation and/or just completing commutation at one brush, the other winding is short-circuited through the other brush.

2. A rotor assembly according to claim 1 in which each winding consists of forwardly and backwardly wound coils and the extreme coil sides of each winding span approximately the full armature periphery.

3. A rotor assembly according to claim 2 in which one or more coil sides of each winding lie in slots common to both windings.

4. A rotor assembly according to claim 1 in which each winding is progressively distributed in the same direction and the extreme coil sides of each winding span approximately one-half the armature periphery.

* * * * *